United States Patent [19]

Frigo

[11] 4,383,249

[45] May 10, 1983

[54] AUDIBLE WARNING DEVICE FOR MOTOR VEHICLES

[75] Inventor: Domenico Frigo, Venice, Italy

[73] Assignee: Fiamm Componenti Accessori S.p.A., Venice, Italy

[21] Appl. No.: 215,369

[22] Filed: Dec. 11, 1980

[51] Int. Cl.³ .............................................. G08B 3/00
[52] U.S. Cl. .............................. 340/384 R; 340/384 E
[58] Field of Search ............... 340/384 R, 384 E, 388, 340/62, 75, 88, 64, 52 R, 692; 307/10 R, 10 BP

[56] References Cited

U.S. PATENT DOCUMENTS 2,892,181  6/1959  Benson et al. .................... 340/64
3,341,816  9/1967  Davis et al. .................... 340/661 X Primary Examiner—John W. Caldwell, Sr.
Assistant Examiner—Daniel Myer
Attorney, Agent, or Firm—Fleit, Jacobson & Cohn

[57] ABSTRACT

An audible warning device which can be fitted indiscriminately to motor vehicles, and is controlled by a push-button switch in a current supply cable or ground conductor of the device, the latter having in both cases similar electrical connections which are few in number. The audible warning device comprises at least one horn which is connected between the current supply cable and the ground conductor and is operated by a control signal, a control unit which is connected to the push-button switch to generate the control signal when the button is pressed, and a voltage regulator which is connected between the current supply cable and the ground conductor and has an output, connected to the control unit, which has a predetermined voltage different from the voltage of the current supply.

2 Claims, 2 Drawing Figures

FIG. I

AUDIBLE WARNING DEVICE FOR MOTOR VEHICLES

BACKGROUND OF THE INVENTION

The present invention relates to an audible warning device for a motor vehicle, of the type comprising at least one horn which is connected between a current supply cable and a ground conductor of the electrical system of the motor vehicle and is operated by a control signal, and a control unit which is connected to a push-button switch provided on the motor vehicle for operating the audible warning device, and generates the control signal when said push-button switch is closed.

Audible warning devices of the aforesaid type are very common in motor vehicles currently in use, being fitted during factory mass-productions as the main warning equipment, or being fitted subsequently as auxiliary warning devices by specialized firms, such as motor electricians, or by individual private owners.

A need has therefore arisen for audible warning devices, particularly for use as auxiliary warning devices, which allow the electrical connections to be made simply, quickly, and safely in any type of motor vehicle. A drawback to fitting the known warning devices currently in use is that different electrical connections are necessary according to the type of motor vehicle.

Before the connections are made, checks must be carried out, using suitable instruments or a wiring diagram of the motor vehicle where this is available, to ascertain whether the motor vehicle is of the type where the push-button switch is located in the current supply cable or the ground conductor. When making the connections, one terminal of the control unit is connected to the free terminal of the push-button switch, while the other terminal must be connected to either the ground conductor or the current supply cable, respectively, depending on the motor vehicle type.

The fitting of audible warning devices of the aforesaid type is a long and laborious process with the possibility of error.

OBJECT OF THE INVENTION

The object of the present invention is to provide an audible warning device of the aforesaid type with constructional and functional characteristics which satisfy the aforementioned need, and overcome the stated drawbacks of the prior art.

SUMMARY OF THE INVENTION

The present invention achieves this object with an audible warning device of the above-specified type, characterised in that it includes a voltage regulator which is connected between the current supply cable and the ground conductor, and has an output connected to the control unit, said output having a predetermined voltage which is different from the voltage of the current supply.

DESCRIPTION OF THE PREFERRED EMBODIMENT

Figure 1:
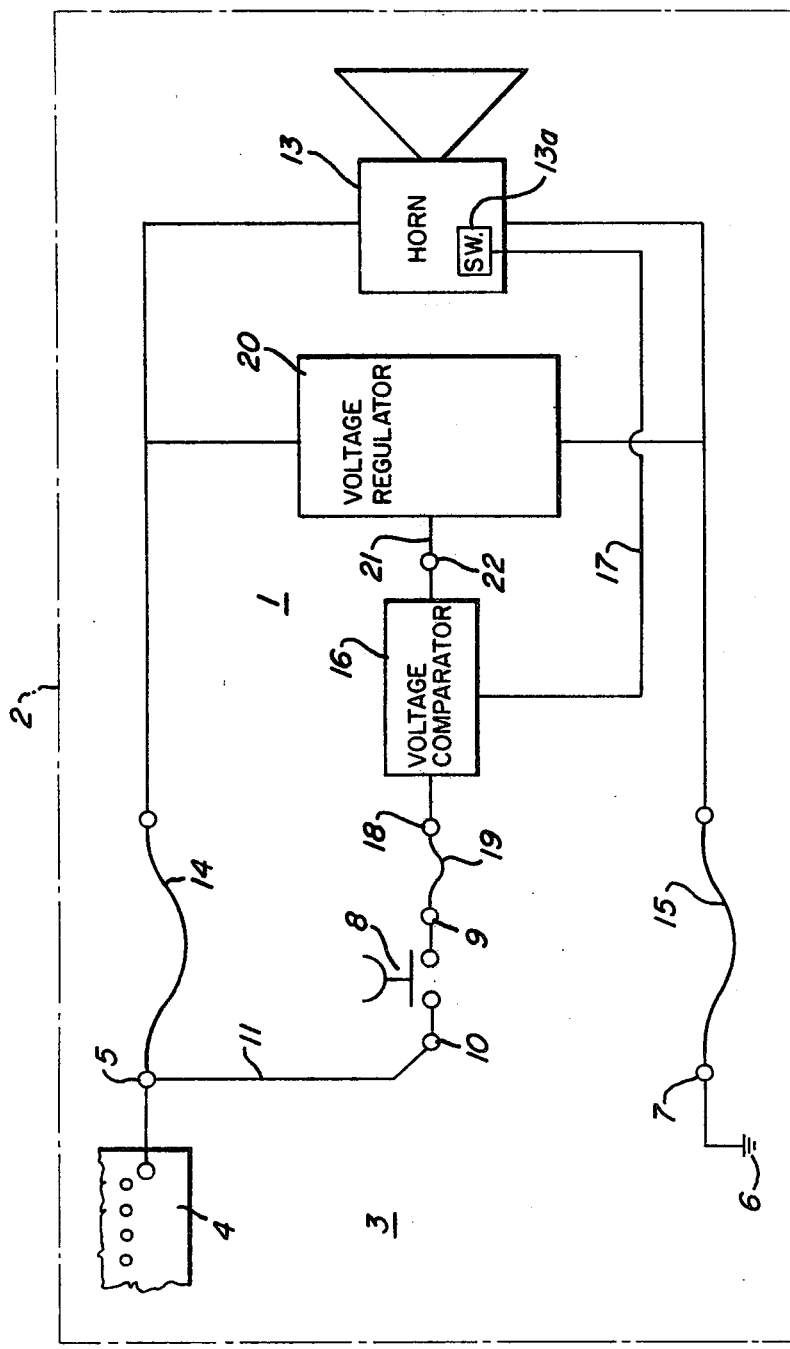
FIG. 1 is a circuit diagram showing the device of the present invention connected to one of the terminals of the power source.
Figure 2:
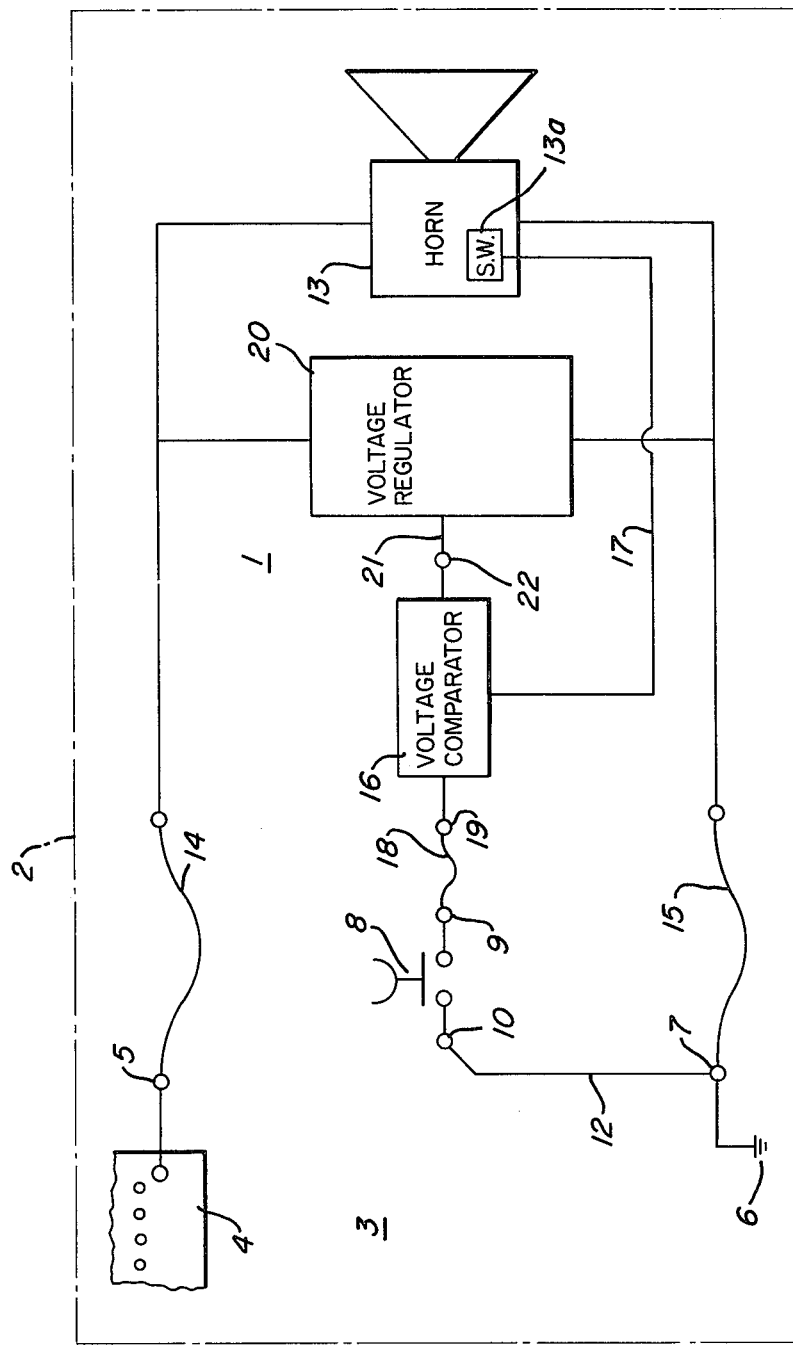
FIG. 2 is a circuit diagram showing the device of the present invention connected to the other terminal of the power source.

With reference to the drawing, there is shown, generally indicated 1, an audible warning device which is fitted to a motor vehicle 2 shown schematically. In the conventional manner, the motor vehicle 2 has an electrical system 3 which includes a battery 4 with an associated current supply cable 5, a ground 6 with an associated ground conductor 7, and a push-button switch 8 which operates the warning device as required, and has a free terminal 9. The other terminal 10 of the switch 8 is connected to the current supply cable 5 or the conductor 7 according to the motor vehicle type; these alternative connections are shown by lines 11, 12 respectively.

The audible warning device 1 comprises an electromagnetic horn 13 which is connected by conductors 14, 15 between the current supply cable 5 and the ground conductor 7 of the electrical system 3, and is operated by a control signal generated by a control unit or voltage comparator 16 to which it is connected by a conductor 17 through activating switch 13a. The control unit 16 has a first terminal 18 which is connected by a conductor 19 to the free terminal 9 of the push-button switch 8.

The audible warning device 1 according to the present invention also includes a voltage regulator 20, which is connected between the current supply cable 5 and the ground conductor 7 in parallel with the horn 13, and has an output 21 connected to a second terminal 22 of the control unit 16. The voltage regulator 20 is calibrated so that the output has a predetermined voltage which is different from the voltage of the current supply. This output voltage is not necessarily stabilised.

It will be appreciated that, when the push-button switch 8 is pressed, a difference in voltage is always established between the first and second terminals 18, 22, the resulting current causing direct activation of the control unit 16, or indirect activation by means responsive to the current, such activation resulting in the generation of the control signal for the horn 13.

The voltage regulator 20 is formed by a negative booster or voltage divider, calibrated so that the output voltage is less than (for example, half) the voltage of the current supply. The voltage regulator 20 may alternatively be formed by a positive booster which is calibrated so that the output voltage is higher than (for example, one and a half times) the positive voltage.

The main advantage of the audible warning device according to the present invention lies in the fact that there is no need for the second terminal 22 of the control unit 16 to be connected with either the current supply cable 5 or the earth conductor 7 (according to the motor vehicle type) at its position of installation. Furthermore, the few similar electrical connections can be effected quickly and simply.

An additional advantage of the device lies in its improved reliability.

I claim:

1. An audible warning device comprising an electrically operated horn, an electric power source, a positive voltage conductor and a ground conductor, said horn being connected between said positive voltage and ground conductors through switch means which are operatable by an electric control signal, an electric control signal generating unit, a push-button switch having one terminal connected either to the positive voltage conductor or to the ground conductor and the other terminal connected to said electric control signal generating unit, a voltage regulator connected between said positive voltage conductor and ground conductor and provided with an output terminal biased at a positive voltage different from the voltage of said positive voltage conductor and connected to said electric control signal generating unit, said electric control signal defined by the difference between the voltage applied to the control signal generating unit by said push-button switch and the voltage applied by said output terminal of the voltage regulator.

2. An audible warning device according to claim 1, in which the voltage of the output terminal of said voltage regulator is smaller than the voltage of said positive voltage conductor.

* * * * *

UNITED STATES PATENT AND TRADEMARK OFFICE
CERTIFICATE OF CORRECTION

PATENT NO. : 4,383,249
DATED : May 10, 1983
INVENTOR(S) : Domenico FRIGO

It is certified that error appears in the above—identified patent and that said Letters Patent is hereby corrected as shown below:

On the title page, insert

-- (30) Foreign Application Priority Data
December 20, 1979 ITALY .............. 28269 A/79

Signed and Sealed this

Eighteenth Day of October 1983

[SEAL]

Attest:

GERALD J. MOSSINGHOFF

*Attesting Officer*     *Commissioner of Patents and Trademarks*